(12) United States Patent
Spalka et al.

(10) Patent No.: US 9,178,872 B2
(45) Date of Patent: Nov. 3, 2015

(54) SERVER SYSTEM AND METHOD FOR PROVIDING AT LEAST ONE SERVICE BASED ON AUTHENTICATION DEPENDENT ON PERSONAL IDENTIFICATION DATA AND COMPUTER SPECIFIC IDENTIFICATION DATA

(76) Inventors: Adrian Spalka, Koblenz (DE); Jan Lehnhardt, Bonn (DE); Florian Rienhardt, Bonn (DE)

( * ) Notice: Subject to any disclaimer, the term of this patent is extended or adjusted under 35 U.S.C. 154(b) by 0 days.

(21) Appl. No.: 13/062,669

(22) PCT Filed: Sep. 9, 2009
(Under 37 CFR 1.47)

(86) PCT No.: PCT/EP2009/061701
§ 371 (c)(1),
(2), (4) Date: Jun. 21, 2011

(87) PCT Pub. No.: WO2010/029111
PCT Pub. Date: Mar. 18, 2010

(65) Prior Publication Data
US 2012/0110645 A1    May 3, 2012

(30) Foreign Application Priority Data
Sep. 9, 2008    (DE) .......................... 10 2008 046 639

(51) Int. Cl.
*H04L 29/06* (2006.01)
*G06F 21/40* (2013.01)
(Continued)

(52) U.S. Cl.
CPC .............. *H04L 63/083* (2013.01); *G06F 21/40* (2013.01); *G06F 21/6218* (2013.01);
(Continued)

(58) Field of Classification Search
CPC ...... H04L 63/0815; G06F 21/31; G06F 21/51
USPC ............................................................. 726/4
See application file for complete search history.

(56) References Cited

U.S. PATENT DOCUMENTS

| 6,567,920 | B1 | 5/2003 | Cromer et al. |
| 7,228,434 | B2 | 6/2007 | Zisowski |

(Continued)

FOREIGN PATENT DOCUMENTS

| EP | 1349033 B1 | 3/2004 |
| EP | 1 927 930 A1 | 6/2008 |

(Continued)

OTHER PUBLICATIONS

Wei Zhou et al: "Implement role based access control with attribute certificates" Advanced Communication Technology, 2004 the 6th International Confere nce on Phoenix Park, Korea Feb. 9-11, 2004, Piscataway, NJ, USA, IEEE vol. 1, Feb. 9, 2004, pp. 536-540, XP010702194, ISBN: 978-89-5519-119-6.

(Continued)

*Primary Examiner* — Izunna Okeke
*Assistant Examiner* — Bryan Wright
(74) *Attorney, Agent, or Firm* — Maschoff Brennan

(57) ABSTRACT

The invention relates to a server system for providing at least one service. The system having an interface for connecting a server to a user's computer, an authentication device that is designed and provided for request personal identification data of a user who logs onto the server via the user computer and to permit the user computer access if authentication is successful, and a server protection system. The server protection system is designed and provides to compare additional user's computer specific identification data with identification data stored in advance on the server, after successful authentication by the authentication device, and to grant authorization to the user's computer to access the service or services depending on the comparison of the user's computer specific identification data. The invention also relates to a method for providing at least one service and the method for executing an application program.

13 Claims, 8 Drawing Sheets

(51) Int. Cl.
*G06F 21/62* (2013.01)
*G06F 21/64* (2013.01)
*G06F 21/51* (2013.01)

(52) U.S. Cl.
CPC ............ *G06F 21/64* (2013.01); *H04L 63/105* (2013.01); *G06F 21/51* (2013.01); *G06F 2221/2129* (2013.01); *G06F 2221/2141* (2013.01); *H04L 63/102* (2013.01)

(56) References Cited

U.S. PATENT DOCUMENTS

| | | | |
|---|---|---|---|
| 7,503,048 | B1* | 3/2009 | Sheets et al. ................ 718/108 |
| 8,272,048 | B2* | 9/2012 | Cooper et al. ................ 726/17 |
| 2002/0053035 | A1 | 5/2002 | Schutzer |
| 2005/0091658 | A1* | 4/2005 | Kavalam et al. .............. 718/104 |
| 2005/0262575 | A1* | 11/2005 | Dweck et al. ................. 726/28 |
| 2006/0059539 | A1 | 3/2006 | Shashikummar et al. |
| 2006/0098795 | A1* | 5/2006 | Choti et al. ............. 379/114.14 |
| 2006/0173781 | A1 | 8/2006 | Donner |
| 2006/0184931 | A1* | 8/2006 | Rochette et al. ............. 717/169 |
| 2008/0120302 | A1 | 5/2008 | Thompson et al. |
| 2008/0127292 | A1 | 5/2008 | Cooper et al. |
| 2008/0134295 | A1* | 6/2008 | Bailey et al. ...................... 726/4 |
| 2009/0031141 | A1* | 1/2009 | Pearson et al. ................ 713/187 |
| 2010/0325695 | A1* | 12/2010 | Suzuki ............................. 726/3 |

FOREIGN PATENT DOCUMENTS

| | | | | |
|---|---|---|---|---|
| JP | 06-332859 A | 12/1994 | | |
| JP | 2005-100321 A | 4/2005 | | |
| WO | WO 2004111809 A1 * | 12/2004 | ................ | G06F 1/00 |

OTHER PUBLICATIONS

Tomur E et al: "Application of temporal and spatial role based access control in 802.11 wireless notworks" Computers & Security, Elsevier Science Publishers. Amsterdam, NL, vol. 25, No. 6, Sep. 1, 2006, pp. 452-458, XP025034331, ISSN: 0167-4048 (retrieved on Sep. 1, 2006), abstract, p. 454-p. 456.

Chinese Office Action dated May 31, 2013 in application no. 200980135320.5.

* cited by examiner

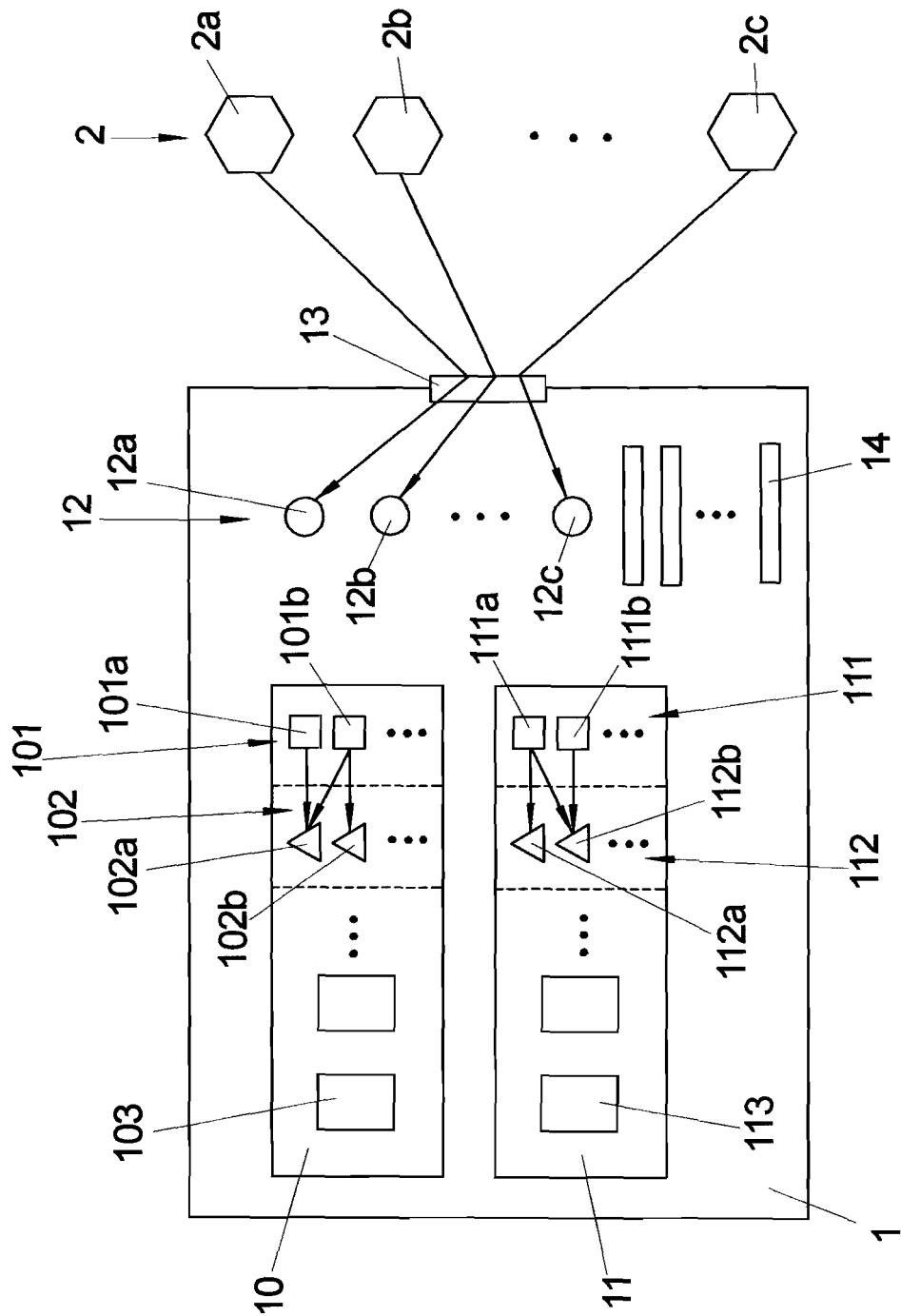

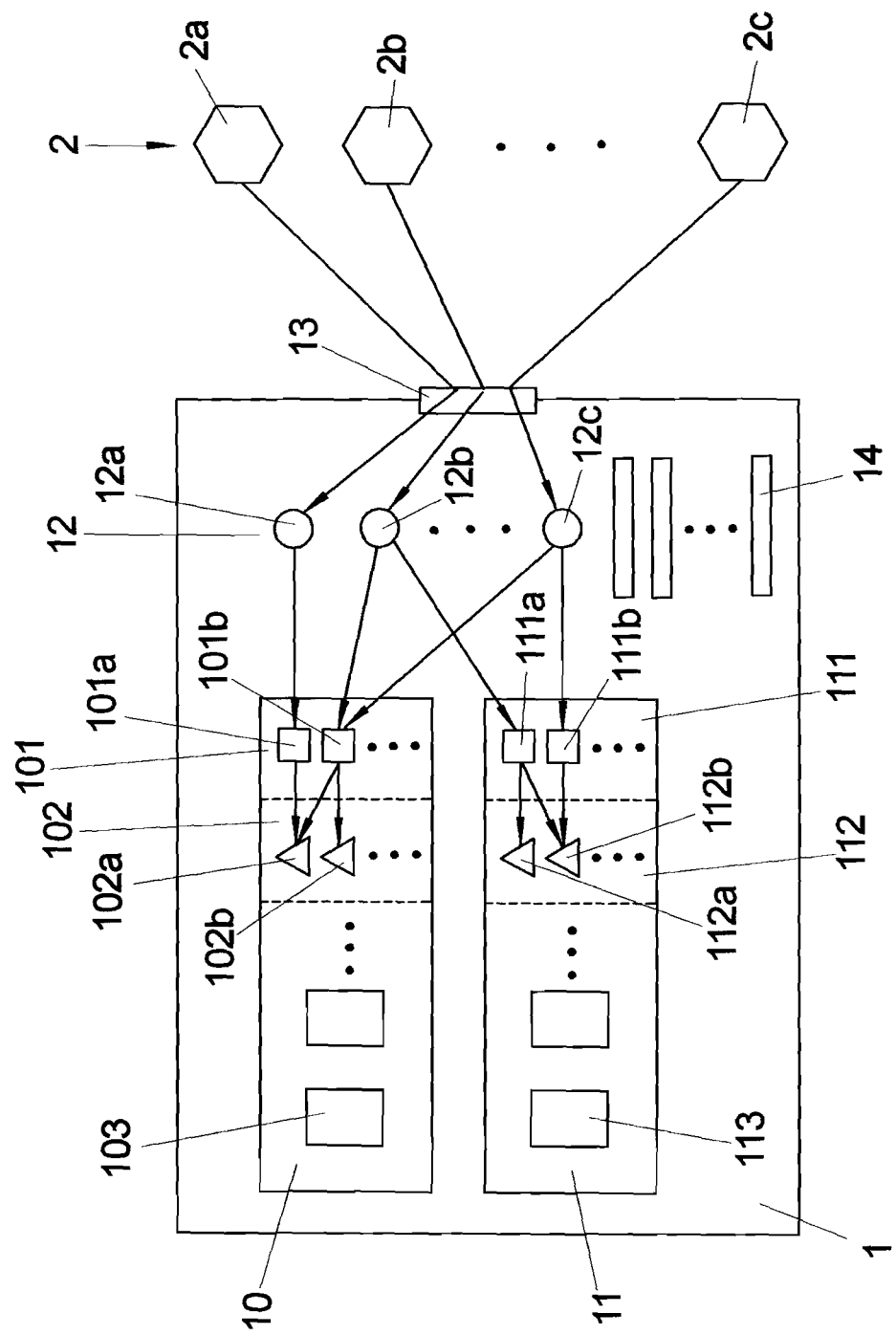

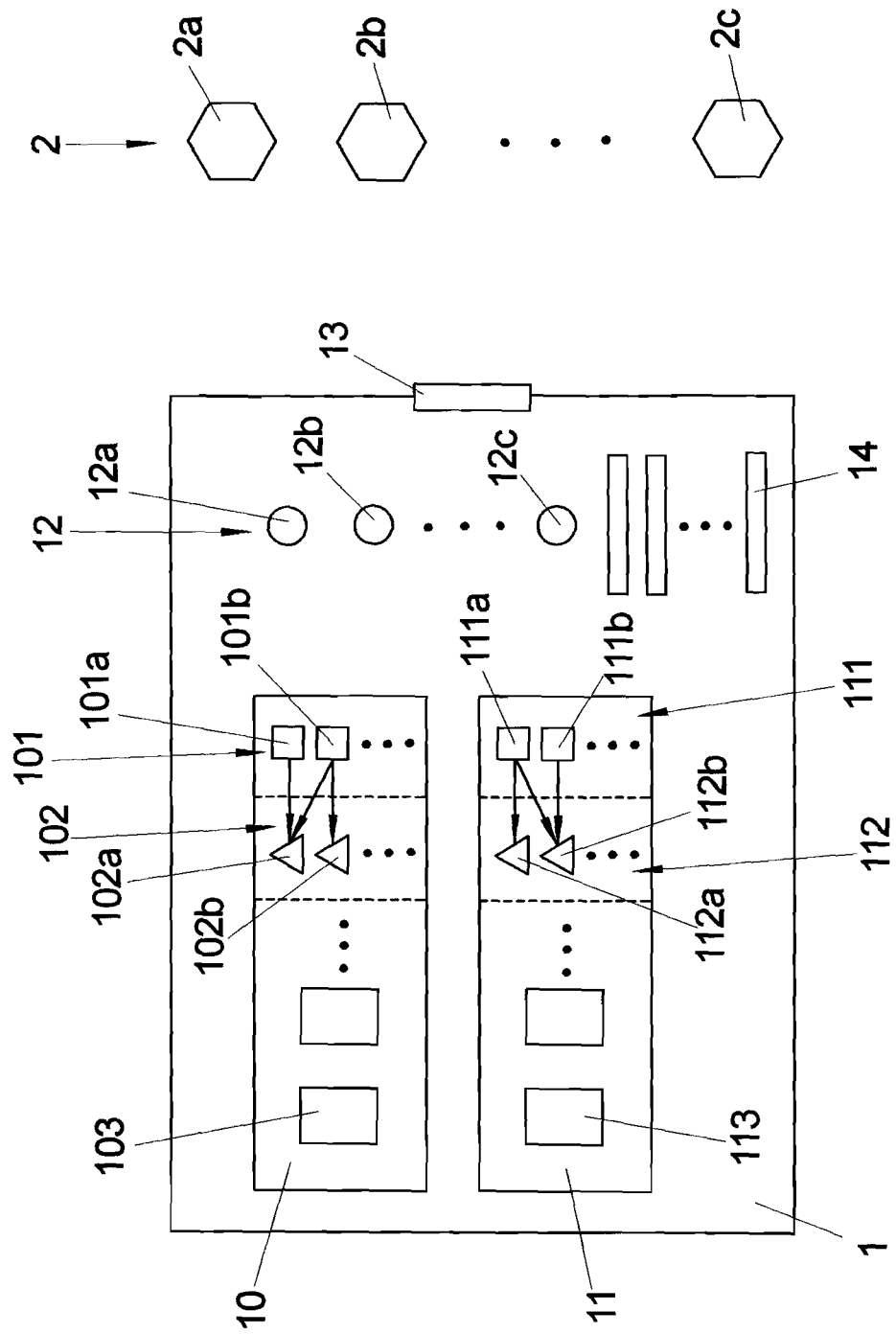

SERVER SYSTEM AND METHOD FOR PROVIDING AT LEAST ONE SERVICE BASED ON AUTHENTICATION DEPENDENT ON PERSONAL IDENTIFICATION DATA AND COMPUTER SPECIFIC IDENTIFICATION DATA

CROSS-REFERENCE TO A RELATED APPLICATION

This application is a National Phase patent application of International Patent Application Number PCT/EP2009/061701, filed on Sep. 9, 2009, which claims priority of German Patent Application Number 10 2008 046 639.5, filed on Sep. 9, 2008.

BACKGROUND

The invention relates to a server system for providing at least one service, a method for providing a service via a server system and a method for executing an application program on a user's computer.

Such a server system for providing at least one service has an interface for connecting a server to a user's computer and an authentication means that is designed and provided to request personal identification data of a user who logs onto the server via the user's computer and permits the user's computer access if authentication is successful.

In the present case a server is to be understood as a computer or computer system which offers services in form of services or data and which can be accessed by different user's computers, the so-called clients. Hereby, the server is set up at a central location in a communication network, for instance the internet, via which a multitude of computers and computer systems are connected with each other for exchanging data. A user can connect to the server via a user's computer and thus can access the server.

In order to avoid that non-authorized users access a server, conventional servers use an authentication, which asks for personal identification data of a user, for instance a user name and a password determined in advance. The server requests thereby the user to enter its user's name and password and permits the user only access to the services of the server if user name and password have been verified. This authentication is also called a weak authentication.

SUMMARY

The object of the present invention is to provide a server system and a method for providing a service and a method for executing an application program, with which an increased protection, when operating the server system, is achieved and an access to services by a non-authorized user can be avoided with increased reliability.

This object is being solved by a server system according to an exemplary embodiment of the invention.

In case of a server system of the previously mentioned kind a server protection system is provided that is designed and provided to compare after successful authentication by the authentication means additional user's computer specific identification data with identification data stored in advance on the server and to grant authorization to the user's computer to have at least one service depending on the comparison of the user's computer specific identification data.

The object is also being solved by a method for providing a service via a server system, wherein a user connects to a server via a user's computer for obtaining access to a service offered by the server, the server requests personal identification data of the user for authentication and the server permits access for the user's computer in case of successful authentication. Hereby, it is provided that after successful authentication additional user's computer specific identification data are compared with identification data stored on the server in advance and the user's computer is granted authorization for having the at least one service depending on the comparison of the user's computer specific identification data.

The present invention is based on the principle idea that besides the certification of personal identification data for authentication of the user additional user's computer specific identification data are requested and to grant the access to a service of the server in dependency on the certification of the additional user's computer specific identification data. The personal identification data of the user can be thereby the user's name and a password, while the additional user's computer specific identification data can be for instance further personal data of the user, a network address of the user's computer, an identification of a pre-determined application program of the user's computer and/or a pre-determined time window. The personal identification data of the user come thereby from the user itself, while the additional user's computer specific identification data come either from the user itself or directly from the user's computer.

If the user's computer specific identification data are additional personal information of the user, the server protection system requires the user to enter the additional personal information—for instance the birthday of the user, the address of the user or the like—and the user transfers the user's computer specific identification data to the server via the user's computer.

If the additional user's computer specific identification data is on the other side the network address of the user's computer, then the server obtains these data in form of the so-called Mac- or IP-address directly from the user's computer in an automatic manner when providing the connection to the server (from the so-called "handshake" of the connection protocol).

If the additional user's computer specific identification data is the identification of an application program, this identification is directly transferred by the application program to the server for instance in form of the name of the application program or a name and password of the application program.

If the additional user's computer specific identification data is a pre-described compliance with a pre-determined time window, then the user can have access only within a pre-determined time window, wherein the server monitors the compliance of the time window by the means of an internal time.

The additional user's computer specific identification data can be arranged also individually to a user or a user group.

The access to a service by a user is therefore only granted, if after an authentication by the means of personal identification data of the user further additional user's computer specific identification data are certified in a further step. The process until the permission for access to the service is provided is therefore divided in two steps. In a first step a so-called weak authentication occurs, wherein only personal identification data, for instance, a user name and a password of a user are requested. If this first authentication is successful, then in a second step additional user's computer specific identification data are certified. For instance, it is certified if the network address (Mac-address or IP-address) of the users computer via which the user tries to access the server match the network address stored in advance on the server. If this is the case, the permission for accessing the desired service is granted to the user. In other words, in this case the user is granted only access to the server from a pre-determined user's computer with a specific network address. In analogue manner, further personal information of the user, an identification of the user application program or a time window can be requested as additional user's computer specific identification data, in order to grant the user access for instance only via a specific application program or only within a specific time window.

The permission for having the at least one service is granted to the user depending on the certification of the user's computer specific identification data. In dependency on the result of that certification different measures can thereby be taken.

It is for instance conceivable, that only in case of a successful certification; this means by the matching of the additional user's computer specific identification data with the identification data stored in advance on the server, access to the service is granted to the user.

Alternatively, it is conceivable that an access is granted, however the user is provided with another (false) service. This is also called "honey pot".

In a third variant it is conceivable that despite of a failed monitoring of the additional user's computer specific identification data to grant an access and to provide the correct service, however, the user is put under specific observation.

In a fourth variant it is conceivable that the access in case of a failed authentication is not yet granted, but instead further user's computer specific identification data are requested for an additional authentication. Only if this additional authentication step fails also, the access is finally refused.

In addition to the mentioned measures, the server can also apply further measures, for instance to inform a system administrator or other pre-determined locations that a non-correct authenticated user tries to access the server.

The server can be for instance designed as a database server, which provides pre-determined data. Basically, the server protection system described here can be used in all server systems, which offer services and which can be accessed via a data network by user's computers (clients).

In a preferred embodiment the permission for having the at least one service is deleted after interrupting the connection of the server to the user's computer. The idea hereby is that a provided connection is completely removed after ending the connection, so that in case of a new connection again a complete authentication with requesting the personal identification data of the user in a first step and requesting or certifying the additional user's computer specific identification data occurs in a second step, The server recognizes advantageously in a detection phase the user's computer specific identification data and stores them in a registry. After the initialization of the server protection system on the server at first a detection phase is conducted, in which the user's computer specific identification data from the user, for instance the network address of the user's computer, via which a user logs onto the server, are determined and stored. The detection phase of the server protection system can thereby occur besides the actual operation of the server in the background, wherein for instance user's computer specific identification data can also be read out from data recorded in advance.

In the detection phase it can furthermore be determined by configuring the adjustments, how it should respond to deviations of the user's computer specific identification data from identification data stored in the registry.

After finishing the detection phase the normal operating phase is then conducted as previously described, wherein for providing an access for having a desired service the additional user's computer specific identification data stored in the detection phase are certified and the access is granted in dependency on the result of this certification.

In a preferred embodiment it can be provided that the server can be exclusively accessed via a specific application program on the user's computer, wherein the connection to the server has to be provided via the application program of the user's computer. For further increasing the protection it is then possible to stipulate that the application program of the user's computer has to be conducted via an application protection system installed on the user's computer, wherein the protection system comprises an administration module and a time running monitor for starting and monitoring the application program.

Since the server can only be accessed via a specific application program and the application program can only be conducted by the means of an application protection system present on the user's computer it is guaranteed that non-authorized users cannot access the server. This application protection system of the user's computer is thereby provided to prevent a manipulation and a non-authorized execution of the application program, so that already on the part of the user's computer it is guaranteed that an access to the server by non-authorized users is not possible.

The application protection system with its administration module and its time running monitor can be designed such that in an initialization phase all system files of the user's computer are detected by the administration module, are provided with an identification and are stored in a first registry of the user's computer. In the initialization phase the application program installed on the user's computer is being told to the administration module in advance. The administration module then certifies which system files and modules are used by the application program, provides these with an additional identification and stores them in form of a reference list in a second registry of the user's computer.

When operating it can be provided and be determined by an adjustment, that the application program can be exclusively started via the administration module.

The conduction of the application program is monitored by the running time monitor. The running time monitor creates hereby at first an identification of the application program and certifies if this identification matches the identification of the application program sent to the administration module in advance. If this identification does not match, then pre-determined measures are introduced, for instance the program start is interrupted. If the identification matches, then the application program is carried out, wherein the running time monitors the access of the application program to the system files.

The running time monitor generates furthermore a protection object, in which the application program is conducted and which isolates the application program from other programs and processes. The protection object prevents that the application program can be accessed from other programs and processes and uses for instance an exclusive set of operating means, for instance a specific keyboard or a specific monitor. Then the application program cannot be accessed via other operating means, for instance by another keyboard. Any contact from the outside to the application program is prevented in this manner by the application protection system.

After ending the program the running time monitor removes completely its protection object.

The application program is therefore conducted in a safe environment. Simultaneously the access of the application program to the system files and modules is monitored, wherein the system files and modules have to match the system files and modules detected in advance by the administration module. If an identification of a system file, to which the application program tries to have access, matches an identification of the system file stored in advance, then the access to the system file by the application program is allowed and the system file is loaded. Hereby, it is certified if the identification of the system file in the first registry—corresponding to all system files of the user's computer—or in the second registry—corresponding to system files which were associated in advance with the application program—is present. If the system file is found and matches, then the system file is cleared. If the system file is on the other hand not found in one or in both registries, then the conduction of the application program is interrupted.

Advantageously, the application protection system of the user's computer and the server communicate with each other for mutual authentication. The authentication can hereby occur according to the ISO/IEC 9798-3 standard, wherein the application protection system and the server authenticate mutually and a connection of the user's computer to the server is only permitted, if the mutual authentication of the application protection system and the server is successful.

The object is also being solved by a method for conducting an application program on a users computer, wherein the application program of the users computer is conducted via an application protection installed on the user's computer, wherein the protection system comprises an administration module and a time running monitor for starting and monitoring the application program. The application program is thereby started via the administration module and the time running monitor monitors the access of the application program to the system files when the application program is conducted.

The administration module can detect system files in an initialization phase, provide them with identification and stores them in a first registry of the user's computer. In the initialization phase it is further certified, which system files are used by the application program, and these system files are provided with an additional identification and are stored in a second registry of the user's computer.

Furthermore, the application protection system can provide a protection object, in which the application program is conducted and which isolates the application program from other programs and processes. The method for conducting an application program on a user's computer by using an application protection system, a protection of selected application programs from outside attacks is provided, in particular from a manipulation by harmful software. A second possible application opportunity lies in a version and licensing control, in the frame of which for instance a license number is requested and a conducting of the application program is only possible by matching of the license number.

The method is based on two basic principles. According to the first basic principle it is being recognized via the application protection system, if a program with correct or modified system files, modules or data works data functions. This is being realized by the running time monitor. According to a second basic principle the application program is conducted within a protection object, which isolates the application program from other programs and processes and makes an access from the outside onto the application program impossible. The protection object can for instance allow the access to the application program only via an exclusive set of operating means, for instance a pre-determined keyboard and a pre-determined monitor, while an access with other means from the outside is impossible.

The cooperation of the application protection system of the user's computer with the server protection system of the server for a mutual authentication is in particular of an advantage, wherein the application protection system assures protection to the server that the application program is not manipulated and runs in a particular safe environment, while the server system for the user's computer guarantees that the user's computer communicates with the correct server.

BRIEF DESCRIPTION OF THE DRAWINGS

The idea of the present invention shall be explained in the following by the means of the examples illustrated in the Figures.

FIG. 2A-2D shows schematic views for obtaining a connection of a user's computer to a server by conducting a weak and a subsequent strong authentication.

DETAILED DESCRIPTION

Figure 1A:
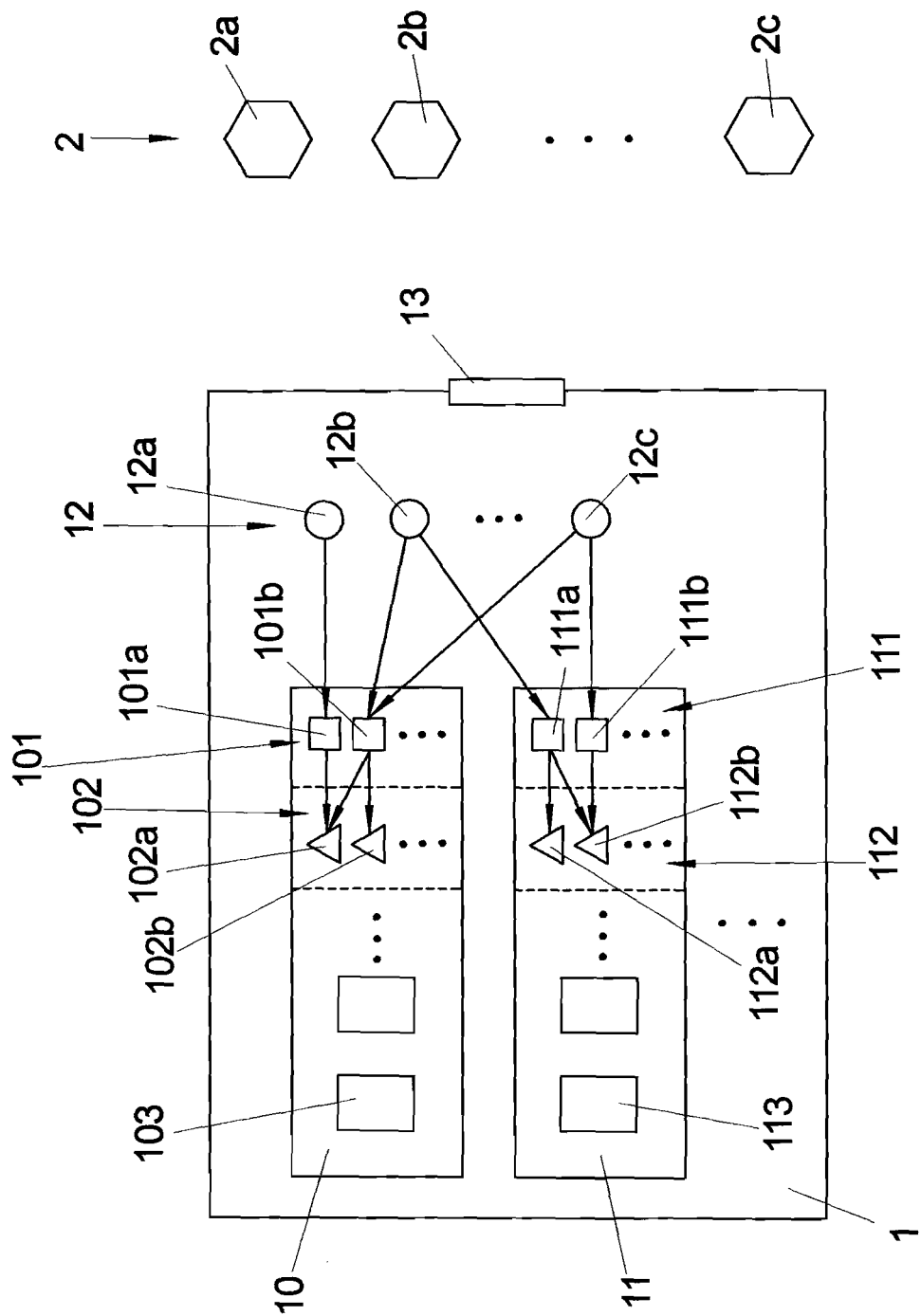
FIG. 1A-1C show schematic views for obtaining a connection of a user's computer to a server by conducting a weak authentication.
Figure 1B:
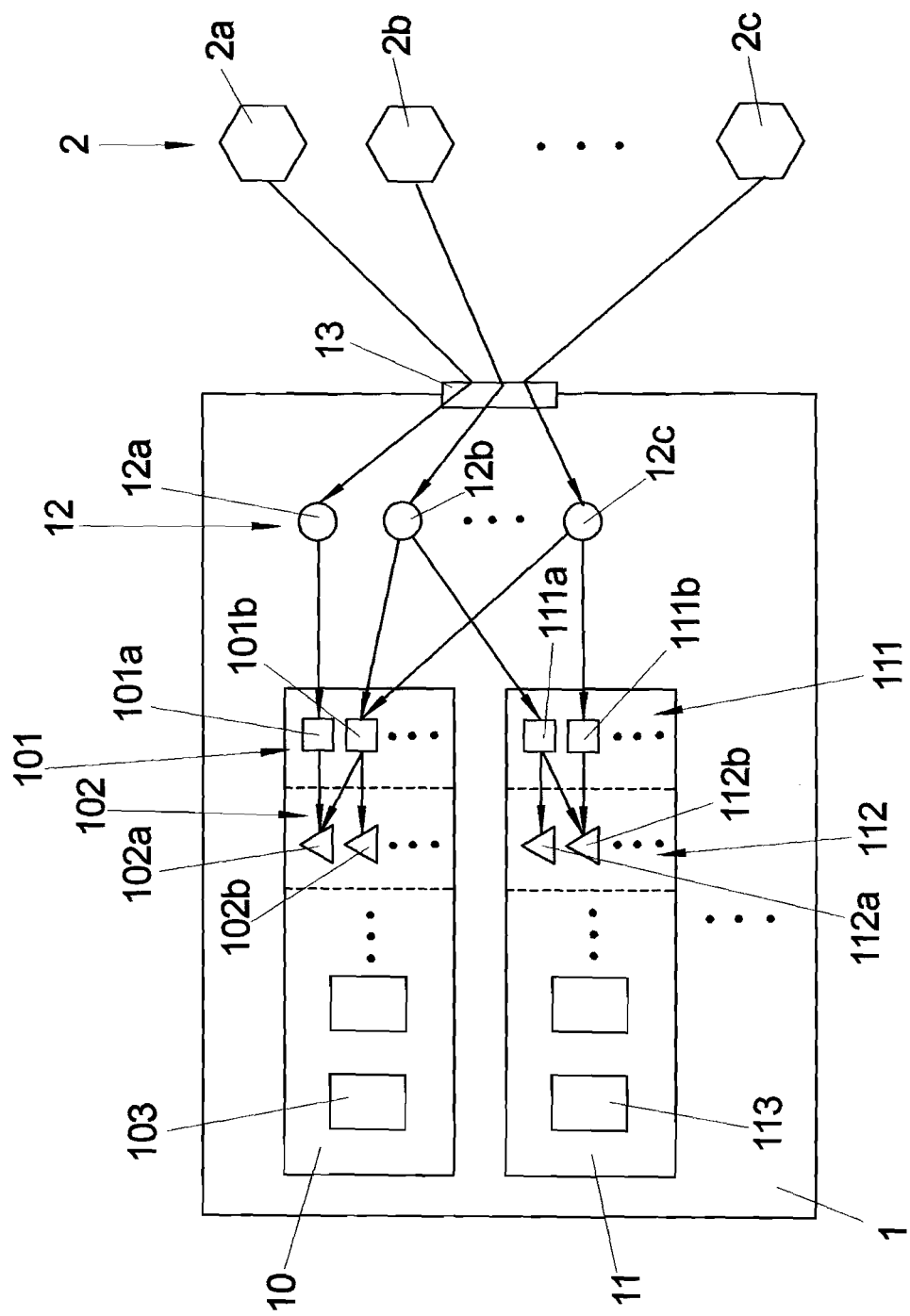
Figure 1C:
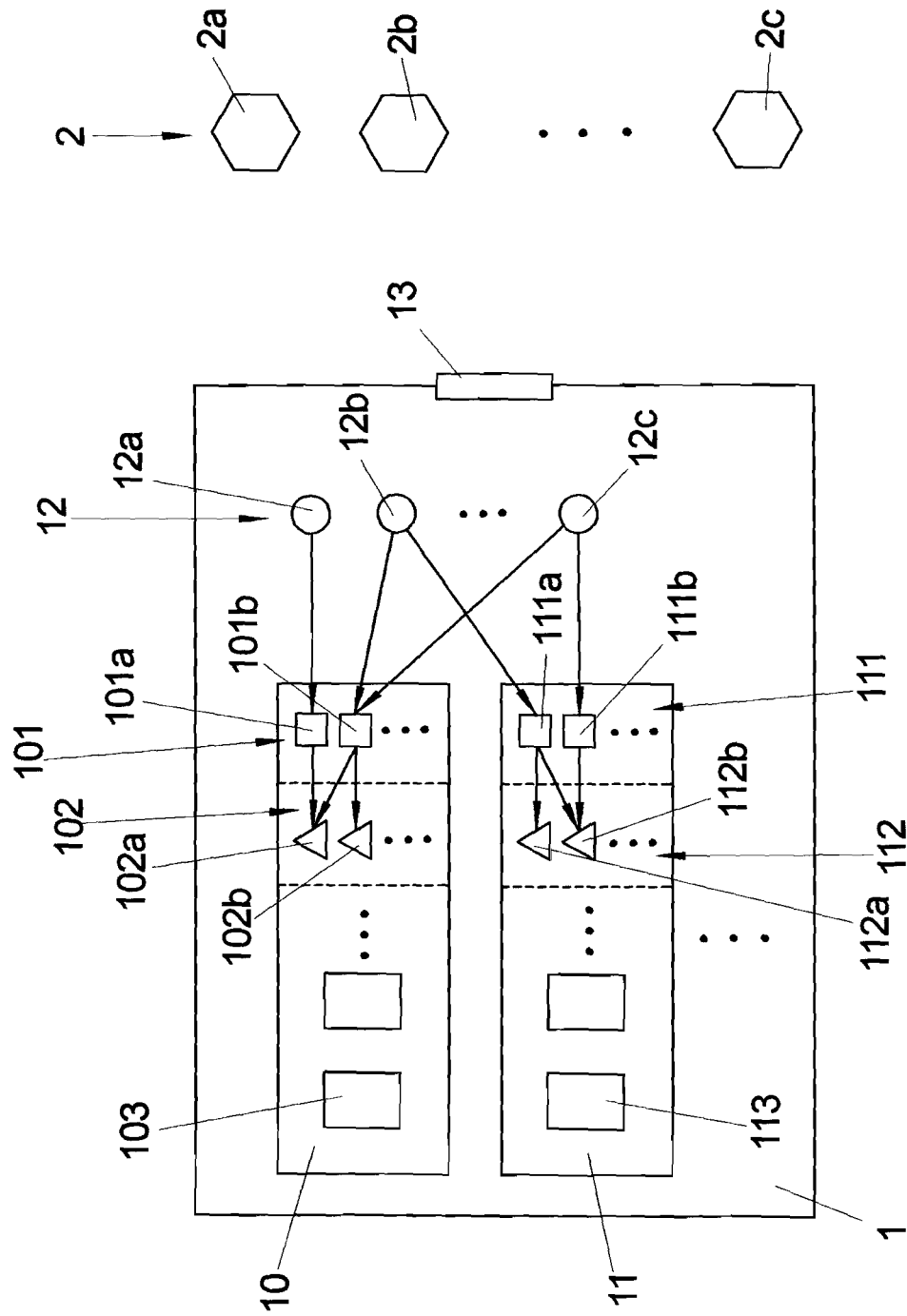

The schematic views according to FIGS. 1A to 1C show the course when obtaining a connection between a user's computer 2 to a server 1 by using a conventional, weak authentication. The server 1 is thereby designed as a database server with different databases 10, 11.

The server 1 offers services in form of data 103, 113 to which a user can have access via a user's computer 2 (client) and an interface 13 of the server 1. A login account 12 of the server 1 is thereby designated to each user, via which a user can connect to the server 1 and log onto the server 1. The login account 12 is again connected to a user account 101, 111 of one or multiple of the databases 10, 11. Each user account 101, 111 is again connected to one or multiple of so-called scrollings 102, 112 via which access can be obtained to a certain data amount of data 103, 113 and in which the data 103, 113 are organized so that the user can access the data 103, 113 and can work with the data 103, 113.

The access to the data 103, 113 is therefore granted to a user via a user's computer 2, the interface 13, the login account 12 designated to the user, one or multiple user accounts 101, 111 connected to the login account 12 and the scrollings 102, 112. FIG. 1A shows the status before obtaining the connection. In this status the connections between the login account 12 of a user, the user accounts 101, 111 and the scrollings 102, 112 are already obtained. Therefore, it is defined by these connections to which the databases 10, 11 with which scrollings 101, 112 and data 13, 113 a user can have access.

In case of the example shown in FIG. 1A the login account 12A is connected to the user account 101a and via the user account 101a to the scrollings 102a. A user corresponding to the login account 12a can therefore access via the login account 12a the scrolling 102a of the database 10 with the associated data 103. The login account 12b on the other side is connected to the user account 101b of the database 10 and the user account 111a of the database 11, wherein the user account 101b of the database 10 is connected to the scrollings 102a, 102b and the user account 111a of the database 11 is connected to the scrollings 112a, 112b. The user assigned to the login account 12b can therefore have access to the data 103, 113 associated with the scrollings 102a, 102b of the database 10 and the scrollings 112a, 112b of the database 11.

For obtaining the connection a user accesses the login account 12 designated to the user via a user's computer 2 and the interface 13. This is schematically illustrated in FIG. 1B, wherein for instance a user accesses the login account 12A via the user's computer 2a and the interface 13. The server 1 carries out hereby a so-called weak authentication within which the user name and the password of the users are requested. If the user name and the password match the user name and password of the login account 12 determined in advance then the authentication is successful and the user is granted the permission for accessing the databases 10, 11 according to the interconnections defined in advance.

After closing the connection that means after the user is logged out, the connection of the user's computer 2 to the respective designated login account 12 is interrupted. The interconnections of the login account 12 to the respective user accounts 101, 111, however, are maintained. This status is illustrated in FIG. 1C.

Usually, a server 1 only conducts a weak authentication by the means of requesting a user name and a password. The security achieved thereby is however low. In particular, attacks from outside and the access by non-authorized users can only be insufficiently prevented, wherein a user as soon as access had been granted via a designated login account 12 can have unrestraint access to the data 103, 113, can manipulate said data and in the worst case can influence the operation of the server 1 strongly.

In the embodiment illustrated in FIGS. 2A to 2D additionally to the previously described weak authentication an additional authentication step is therefore carried out, which is designated as strong authentication. In the embodiment illustrated in FIG. 2A to FIG. 2D the server 1 contains additionally a registry 14 in which user's computer specific identification data of the user's computer 2 and the designated user in form of reference listed are stored. The authentication for obtaining the connection of a user's computer 2 to the server 1 and for providing the service offered by the server 1 in form of data 103, 113 is then carried out in the manner illustrated in FIG. 2A to FIG. 2D.

Figure 2A:
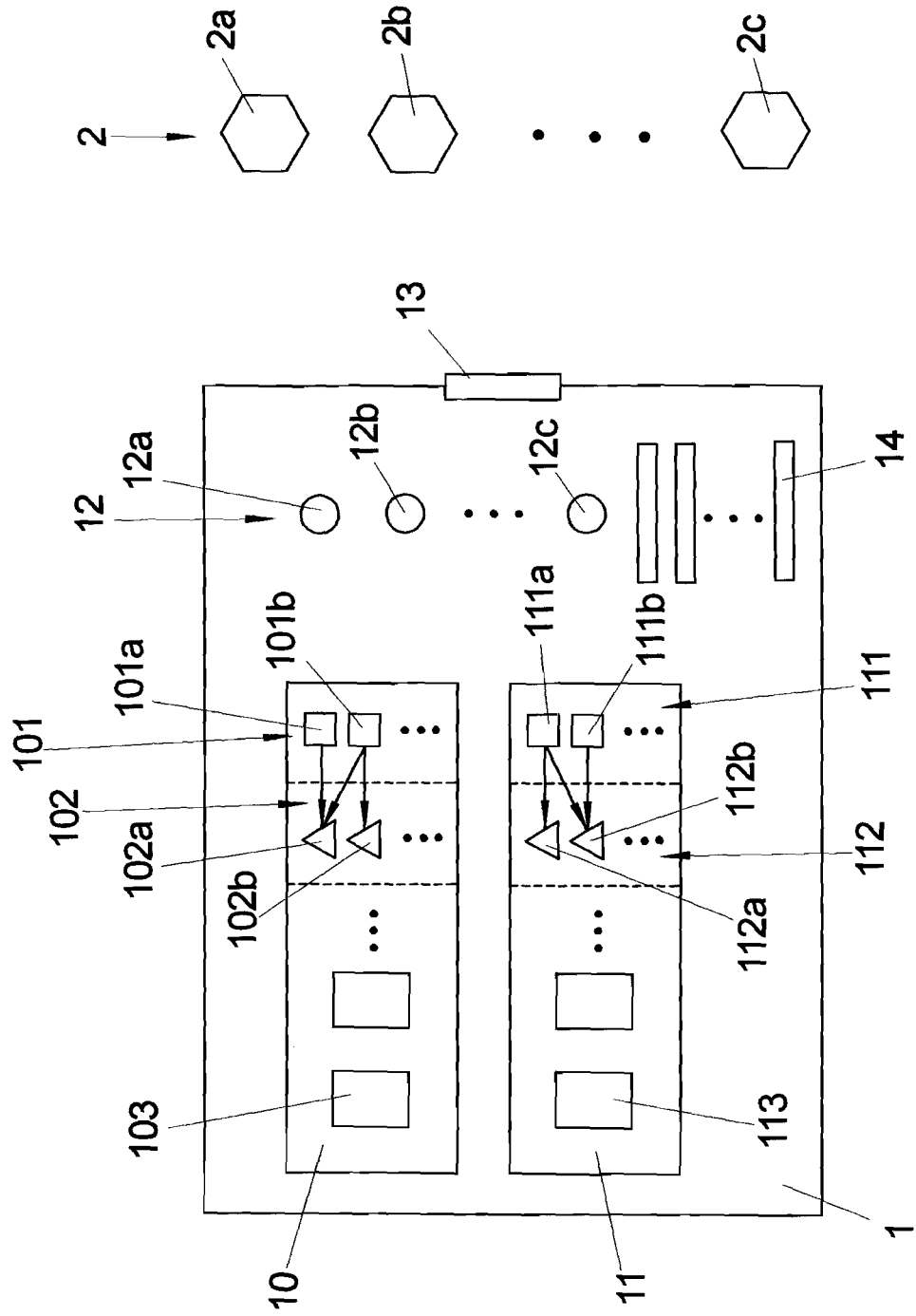

FIG. 2A shows the initial state before obtaining a connection. In this state no interconnections of the login accounts 12 to the designated user accounts 101, 111 exist.

In a first step, the user obtains a connection to the designated login account 12 via a user's computer 2 and the interface 13 of the server 1, wherein within a first authentication step a weak authentication is carried out by requesting a user's name and password. This is illustrated in FIG. 2B. In the illustrated example, a user obtains for instance a connection to the designated log in account 12a via a user's computer 2a.

In the status illustrated in FIG. 2B, the user's computer 2 is connected via the interface 13 to the server 1 and the designated login account 12. The access to the data 101, 113 is however not granted to the user, since interconnection of the login account 12 to the designated user accounts 101, 111 has not yet been obtained.

In a second step, a so called strong authentication occurs now within which additional user's computer specific identification data are requested and are compared with identification data stored in advance in the registry 14. The user's computer specific identification data can hereby be for instance additional personal information of a user, which the user transfers via the user's computer 2 to the server 1. Alternatively, or additionally, also the network address (IP address or Mac address) of the user's computer 2 can be monitored within the user's computer specific identification data. This is based on the fact that a user shall only be granted access to the server 1 via a specific users computer 2 with a pre-determined network address. Furthermore, the identification of a pre-defined application program or a pre-defined time window can be used as additional user's computer specific identification data. Through this, access is allowed for the user only via a specific application program or only within a pre-defined time window.

If this second authentication is successful, the pre-defined connections of the login accounts 12 to the user accounts 101, 111 are obtained. In the example illustrated in FIG. 2C the login account 12a is for instance connected to the user account 101a, while the login account 12b is connected to the user accounts 101b, 111a. The user can therefore access the data 103, 113 via the user accounts 101, 111 and the designated scrollings 102, 112 and can have the data 103, 113.

The second authentication step by the means of user's computer specific identification data stored in the registry 14 takes place via a server protection system installed on the server 1. Thereby, it is of importance that the server 1 carries out at first the weak authentication for connecting a user's computer 2 to the designated login account 12. Herewith, the authentication for the server 1 is finished. The connection of the user to the designated login account 12 is obtained. In this status the user, however, cannot access the data 103, 113 since the interconnections between the login account 12 and the designated user accounts 101, 111 have not yet been established. The further authentication is taken over by the server protection system via the registry 14 and the monitoring of the additional user's computer specific identification data; wherein in dependency on the monitoring of the respective login account 12 is connected to the designated user's accounts 101, 111. The authentication is therefore divided by two. After a first authentication step carried out by the server 1 a second authentication step occurs carried out by the server protection system by the means of the registry 14, wherein in dependency on successful first and second authentication the access to the data 103, 113 is granted.

If the first authentication of the server 1 for obtaining the connection of a user's computer 2 to the designated login account 12 via the interface 13 as well as the second authentication by monitoring the user's computer specific identification data are successful, then the interconnections of the login account 12 to the designated user's account 101, 111 illustrated in FIG. 2C are obtained and the user can access the database 10, 11.

After closing the connection as illustrated in FIG. 2D on the one hand the connection between the user's computer 2 and the designated login account 12 is interrupted and simultaneously also any interconnection between the login account 12 and the user's account 101, 111 is deleted. The interconnections between the login account 12 and the user's accounts 101, 111 are therefore completely removed and are only obtained again by a renewed login and by successful renewed authentication.

Since an additional, also as strong named authentication is carried out by certifying the additional user's computer specific identification data, the safety for operating the server 1 is tremendously increased. Due to the additional certification of the user's computer specific identification data it is in particular prevented that non-authorized users can have access to server 1. This guarantees that an access can for instance occur only via a pre-defined computer with a defined network address or via a specific application program. Furthermore, an access can also only be granted during specific times.

If the additional authentication is not successful, different measures can be taken. It is for instance conceivable that in case of non-successful authentication the access for a user is completely denied. If for instance the first authentication by requesting the user names and passwords already fails, the access for the user is completely denied. The same is true, if the first authentication is successful, but the additional authentication by requesting the user's computer specific identification data is not successful, for instance because the network address of the user's computer 2 via which the user tries to access the server 1 does not match a network address stored in advance.

Instead of denying access, however, also less rigid measures are conceivable. For instance a user can be granted access despite unsuccessful authentication, wherein the user is however provided with other than the desired data (so-called honey pot). It is also conceivable to grant the access and provide the correct desired data, however the user is put under surveillance, i.e. his actions are monitored in a specific manner. Alternatively, it is again conceivable not to grant the access at first and request further identification data for further authentication and only in dependency on this further authentication to grant the access or finally to deny access.

The user's computer specific identification data, which shall be requested in case of the additional authentication, can be detected in a detection phase before the actual operation of the server 1 and can be stored in the registry 14. In the detection phase for instance the network address and the application program to be used are determined and are deposited in the registry 14, wherein in the latter operation phase during the actual operation of the server 1 an access to the server 1 is only possible via the user's computer 2 defined in advance with the pre-defined network address and the pre-defined application program. In the detection phase the server protection system can also work in the background, wherein no or at least no complete strong authentication is carried out. In an operation phase after finishing the detection phase an access is then only granted in dependency on a successful authentication in the above described manner.

An additional protection can be achieved, if a user is granted access only to the server exclusively via a pre-defined application program. If the application program is thereby conducted on the user's computer 2 by the means of an application protection system, then it is excluded right from the beginning that a non-authorized user can access the server 1 via any user's computer and any application program.

Figure 3:
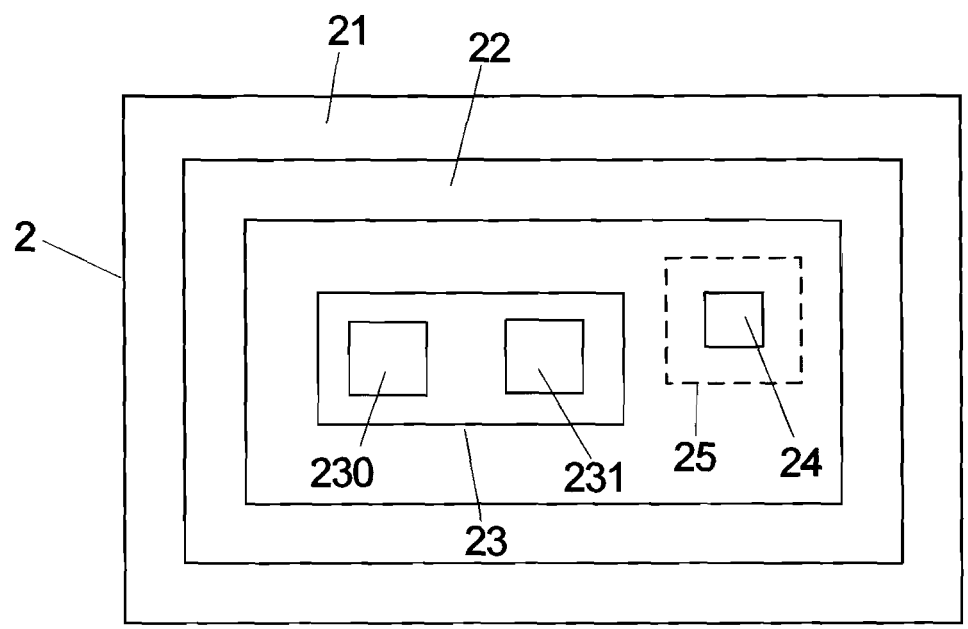
FIG. 3 shows a schematic view of conducting an application program on a user's computer by using an application protection system.

FIG. 3 shows a schematic view of an application program 24 installed on a users computer 2. Thereby, a protection wall 21 (fire wall) as well as a virus scanner 22 are installed on the user's computer 2, which prevent an access from the outside to the user's computer 2 as well as a manipulation by a harmful software as far as possible in a known manner. In addition, an application protection system 23 with an administration module 230 and a running time monitor 231 is installed on the user's computer 2, which monitor the starting and the conducting of the application program 24.

The administration module 230 of the application protection system 23 serves the administration. The administration module 230 detects thereby in an initialization phase all system files of the user's computer 2 and stores the file in a registry in form of a reference list. The administration module 230 detects thereby for each system file and each module an identification, for instance in form of a cryptographic hash value or a digital signature, and deposits them in the registry. An identification of the application program 24 to be put under protection is then told to the administration module 230, whereupon the administration module 230 detects for the application program 24 the system files and the modules of the user's computer 2, to which the application program 24 has access. In turn, the administration module 230 detects for each such detected system file an identification and stores these together with the identification of the application programs 24 in a separated registry.

It is additionally determined that the starting of the application program 24 can exclusively occur via the administration module 230. Herewith, each attempt to start the application program 24 not via the administration module 230 is excluded right from the beginning.

The application program 24 is started via the administration module 230 for carrying out the said application program. The conduction of the application program 24 is then monitored by the running time monitor 231, wherein the running time monitor 231 compares at first the identification of the application program 24 with the identification of the application program 24 stored in advance by the administration module 230 in the registry. Only if this identification matches then the starting and conducting of the application program 24 is permitted.

The running time monitor 231 generates a protection object 25 in form of an operating system object and provides them specific protection properties. The application program 24 is conducted in this protection object 25, wherein the protection object 25 isolates the application program 24 from all other programs and processes of the user's computer 2 and makes any contact to the application program 24 from the outside impossible. The protection object 25 has thereby an exclusive set of operating means, for instance a specific keyboard or a specific monitor via which the application program 24 can be controlled.

The application program 24 is conducted in the protection object 24 until it is finished. After finishing the application program 24 the protection object 25 is completely removed.

During the time of conduction of the application program 24 the running time monitor 231 monitors each request of the application program 24 to a system file or a module of the user's computer 2 and certifies, if the identification of the system file or the module is present in the registry stored in advance by the administration module 230 within the initialization phase. The time running monitor 231 certifies thereby, if the identification of the system file is contained in the registry of all system files of the user's computer 2 or in the registry of the system files or modules designated to the application program 24. If the requested system file is not in one or in both of the registries, the conduction of the application program 24 is interrupted. If the system file is in both registries, then the requested system file or the requested module is approved and the conduction of the application program 24 is continued.

The conduction of an application program 24 is monitored and controlled by the means of the application protection system 23 and in this manner protected from attacks from outside, for instance by a harmful software. Simultaneously, a version and license control can be carried out by the application protection system 23 by checking for instance during conduction if the application program 24 is conducted using a valid license number.

In a preferred embodiment the application protection system 23 of the user's computer 2 and the server protection system of the server 1 work together. The application protection system 23 communicates hereby with the server 1, wherein the server 1 and the application protection system 23 authenticate each other. The communication can occur for instance via the ISO/IEC 9798-3-standard. The application protection system contacts thereby in a first step the server 1. In a second step, the application protection system 23 and the server 1 conduct a mutual authentication, wherein by the mutual authentication the server 1 knows on the one hand that the application program 24 is not being manipulated, and on the other hand, the user's computer 2 can be sure to communicate with the correct server 1.

The communication between server 1 and user's computer 2 in the previously described examples occurs preferably via the internet, which is a communication network for data exchange between different computers and computer systems as known.

The idea forming the basis of the invention is not restricted to the previously described embodiments, but can also be realized by completely different embodiments. The described protection system is in particular not restricted to the application for a database server, but can also be used in general for protecting a server. Furthermore, the described system can also be used as a forensic means in order to analyze infringements of access regulations.

The invention claimed is:

1. A method for providing at least one service via a server system, in which
- a login account associated with the user and at least one user account associated with the login account are present on the server system in an initial state prior to the user's computer connecting to the server system, but are not linked to each other,
- a user logs onto a server via a user's computer for obtaining access to a service offered by the server,
- the server requests, in a first step, personal identification data of the user for authentication and
- the server allows the user's computer access after successful authentication wherein the user upon successful authentication gains access to the login account of the server,
- wherein
- additional user's computer specific identification data are compared, in a second step, with identification data stored in advance on the server after successful authentication in the first step;
- authorization is granted to the user's computer to access the at least one service in dependency on the comparison of the user's computer specific identification data;
- upon successful authorization a link between the login account and the at least one user account of the server to allow access to the at least one service is established, wherein the link is deleted after interrupting the connection of the server to the user's computer;
- an application program of the user's computer provides the connection to the server;
- the application program of the user's computer is executed via an application protection system installed on the user's computer, wherein said protection system comprises an administration module and a running time monitor for starting and monitoring the application program;
- the administration module detects system files in an initialization phase, provides them with an identification and stores them in a first registry of the user's computer; and
- it is examined for the application program in the initialization phase, which system files are used by the application program, and such system files are provided with an additional identification and are stored in a second registry of the user's computer.

2. The method according to claim 1, that wherein the at least one service can only be accessed by the user's computer, if the additional computer user specific identification data correlate with the identification data stored in advance, wherein in particular the personal identification data of the user are a user name and a password.

3. The method according to claim 1, wherein the additional user's computer specific identification data are personal data of a user, a network address of the user's computer, an application program of the user's computer and/or a pre-determined time window.

4. The method according to claim 1, that wherein the user transfers the user's computer specific identification data via the user's computer to the server or the user's computer transfers automatically the user's computer specific identification data to the server.

5. The method according to claim 1 wherein the server is provided as a database server and the service offered by the database server consists in providing predetermined data.

6. The method according to claim 1 wherein in a detection phase the user's computer specific identification data are registered by the server and are stored in a registry, wherein in particular in the detection phase it is determined how it is responded to deviations of the user's computer specific identification data from the identification data stored in the registry.

7. The method according to claim 1, wherein the application program is exclusively started via the administration module.

8. The method according to claim 1, wherein the running time monitor monitors the access to the system files by the application program when the application program is executed.

9. The method according to claim 1, wherein the application protection system provides a protection object, in which the application program is executed and which isolates the application program from other programs and processes.

10. The method according to claim 1, wherein the application protection system and the server communicate with each other for mutual authentication, wherein in particular the communication of the application protection system and the server are carried out according to the ISO/IEC 9798/3/Standard.

11. A method for executing an application program on a user's computer, wherein the application program of the user's computer is executed via an application protection system installed on the user's computer, wherein the application protection system comprises an administration module and a running time monitor for starting and monitoring the application program, wherein
- the application program is started via the administration module and
- the running time monitor monitors the access of the application program to system files, when the application program is executed,
- the administration module, in an initialization phase, detects system files, provides them with an identification and stores them in a first registry of the user's computer, and
- it is examined, in the initialization phase, which system files are used by the application program, and such system files are provided with an additional identification and are stored in a second registry of the user's computer.

12. The method according to claim 11, wherein the application protection system provides a protection object, in which the application program is executed and which isolates the application program from other programs and processes.

13. A method for providing at least one service via a server system, in which
- a user logs onto a server via a user's computer for obtaining access to a service offered by the server, the server requests personal identification data of the user for authentication and the server allows the user's computer access after successful authentication, wherein additional user's computer specific identification data are compared with identification data stored in advance on the server after successful authentication and authorization is granted to the user's computer to access the at least one service in dependency on the comparison of the user's computer specific identification data, wherein an application program of the user's computer provides the connection to the server, the application program of the user's computer is executed via an application protection system installed on the user's computer, wherein said protection system comprises an administration module and a running time monitor for starting and monitoring the application program, the administration module detects system files in an initialization phase, provides them with an identification and stores them in a first registry of the user's computer, and it is examined for an application program in the initialization phase, which system files are used by the application program, and these such system files are provided with an additional identification and are stored in a second registry of the user's computer.

* * * * *